US005748755A

United States Patent [19]

Johnson et al.

[11] Patent Number: 5,748,755

[45] Date of Patent: May 5, 1998

[54] PICTURE CHECKS

[75] Inventors: Thomas W. Johnson, E. Amherst; John L. Muerle, Grand Island, both of N.Y.

[73] Assignee: Moore Business Forms, Inc., Grand Island, N.Y.

[21] Appl. No.: 637,594

[22] Filed: Apr. 25, 1996

Related U.S. Application Data

[63] Continuation of Ser. No. 880,033, May 8, 1992, abandoned.

[51] Int. Cl.[6] .................... H04N 1/00

[52] U.S. Cl. .................... 382/115; 382/118; 358/403; 358/450

[58] Field of Search .................... 358/448, 450, 358/452, 462, 400, 403, 404, 444; 382/115, 118, 140; 345/150, 143; 902/1–6; 340/825.34; 283/77; 395/235–238; 235/375–380; H04N 1/00

[56] References Cited

U.S. PATENT DOCUMENTS

| | | | |
|---|---|---|---|
| 2,462,735 | 2/1949 | Goldwater | 283/77 |
| 3,048,697 | 8/1962 | Cavanaugh et al. | 283/77 |
| 3,402,488 | 9/1968 | Leavitt | 40/2.2 |
| 3,759,610 | 9/1973 | McVittie | 355/17 |
| 4,130,834 | 12/1978 | Mender et al. | 358/127 |
| 4,245,035 | 1/1981 | Poshkus | 430/496 |
| 4,467,335 | 8/1984 | Schmidt et al. . | |
| 4,687,526 | 8/1987 | Wilfert | 156/64 |
| 4,821,118 | 4/1989 | Lafreniere | 348/150 |
| 4,845,634 | 7/1989 | Vitek et al. . | |
| 4,865,351 | 9/1989 | Smithson et al. | 283/58 |
| 4,874,935 | 10/1989 | Younger . | |
| 4,888,648 | 12/1989 | Takeuchi et al. | 358/335 |
| 4,907,274 | 3/1990 | Nomura et al. . | |
| 4,911,478 | 3/1990 | Oshikoshi et al. | 283/87 |
| 4,928,996 | 5/1990 | Oshikoshi et al. | 283/109 |
| 4,930,014 | 5/1990 | Maeda et al. | 358/209 |
| 4,933,849 | 6/1990 | Connell et al. | 364/400 |
| 5,075,769 | 12/1991 | Allen et al. | 358/75 |
| 5,109,281 | 4/1992 | Kobori et al. | 283/77 |
| 5,199,081 | 3/1993 | Saito et al. | 382/2 |
| 5,259,025 | 11/1993 | Monroe et al. | 382/2 |
| 5,283,644 | 2/1994 | Maeno | 382/2 |
| 5,406,324 | 4/1995 | Roth | 348/143 |
| 5,432,864 | 7/1995 | Lu et al. | 382/118 |
| 5,506,691 | 4/1996 | Bednar et al. | 358/404 |
| 5,602,936 | 2/1997 | Green et al. | 382/140 |
| 5,642,160 | 6/1997 | Bennett | 382/115 |

FOREIGN PATENT DOCUMENTS

| | | | |
|---|---|---|---|
| A-0 232 709 | 8/1987 | European Pat. Off. . | |
| 9316447 | 8/1993 | Germany | G07F 17/26 |
| 2 037 661 | 7/1980 | United Kingdom . | |
| A-2 228 445 | 8/1990 | United Kingdom . | |
| WO-A-8 607 480 | 12/1986 | WIPO . | |
| WO-A-8 703 724 | 6/1987 | WIPO . | |

OTHER PUBLICATIONS

DATACARD, "A Complete System To Issue Low-Cost Photo ID Cards In Seconds", 1993.

Polaroid Summer 1990, "Details On Signal Processing", p. 3.

Canon 1989 Brochure, "Canon Still Video System From Cameras to Transceivers".

*Primary Examiner*—Kim Vu
*Attorney, Agent, or Firm*—Nixon & Vanderhye P.C.

[57] ABSTRACT

A method and apparatus for composing documents such as bank checks with a picture of an account holder on each check comprising the steps of a) capturing a real time video image of the account holder at a bank site; b) converting the image to a digital image file in a personal computer; c) composing a picture check as a graphics image file in the personal computer; d) merging the digital image file and graphics image file to form a picture check; and e) printing one or more picture checks at the bank site and delivering the picture checks to the customer.

18 Claims, 2 Drawing Sheets

Fig. 1
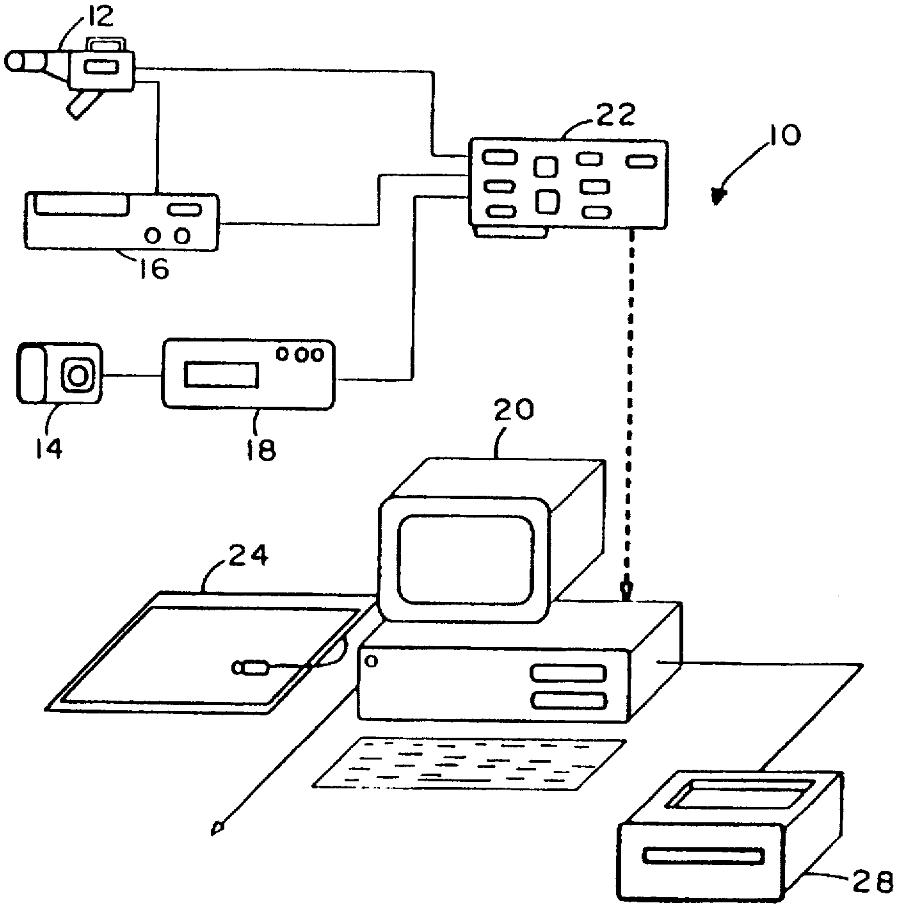
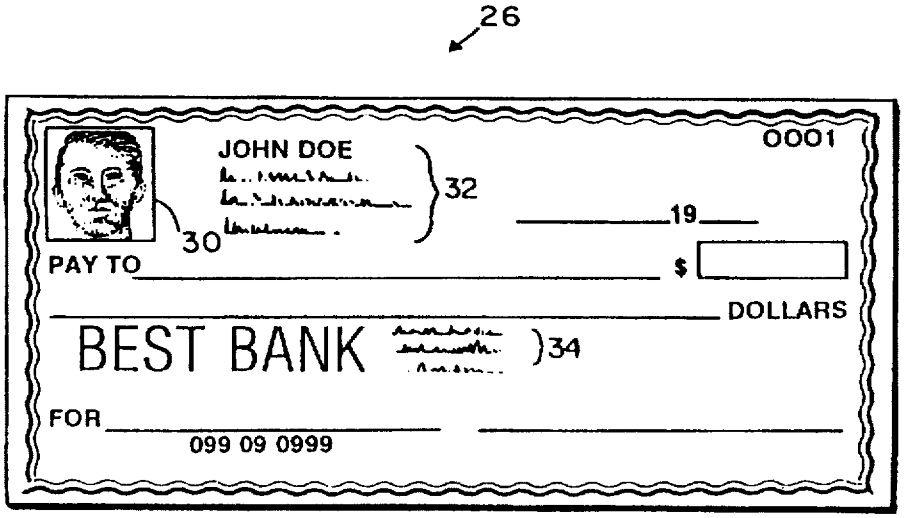
Fig. 2

PICTURE CHECKS

This is a continuation of application Ser. No. 07/880,003, filed May 8, 1992, now abandoned.

This invention relates to a method and apparatus for printing personal bank checks or other documents with a picture of e.g., the account holder or person otherwise identified in the document.

BACKGROUND AND SUMMARY OF THE INVENTION

There have been several attempts in the past to incorporate a photograph in personal documents such as bank checks and other identification type documents or cards. In U.S. Pat. No. 5,075,769, there is disclosed a video identification system for producing color photo print identification cards. The system provides a frame of portrait video, processes the portrait video, provides identification card format and individual specific data, forms a combined identification card image of the portrait video, card format and individual specific data, and produces a hard copy image of the identification card image. In U.S. Pat. No. 4,865,351, a method is disclosed wherein a photograph is adhesively applied to a bank check. In U.S. Pat. No. 4,687,526, there is disclosed a method of making an identification card wherein a photograph from a video camera is converted to digital data which may be combined with signatures, fingerprints, and variable data from a keyboard. The digital data is then fed to a laser printer that prints the photograph and any other desired alphanumeric information on a paper sheet. The paper sheet may then be laminated under heat and pressure between two sheets of transparent thermoplastic material to form an identification card. In U.S. Pat. Nos. 4,911,748 and 4,928,996, there is disclosed a process for forming personal booklets with photographs such as passports and bank books. In producing a passport, for example, personal data is prepared by entering it with a word processor having a CRT display, a bar code reader and a keyboard based on data provided in the application form and stored in a floppy disk. The personal data is stored in the form of coded data entry along with the personal identifying number read out from the bar code label. The picture of the applicant is supplied by the applicant and is attached to the application form. The applicant's image along with the personal data is then composed as a single composite image by an image composer device. The operator of the system can then edit the composite image on a color monitor (a color CRT display) and ultimately the composite image is printed on thermal transfer type photosensitive printing paper. The image is then developed and transferred to an image receiving layer by a video printer and the thermal transfer process. The image receiving layer is then incorporated into a multi-layer front page of a booklet.

U.S. Pat. No. 4,921,278 describes a computer generated identification system where the owner's signature and/or photograph is provided as hidden information on an identification card. The coded or hidden information will reappear when the ID card is placed in a read-out machine where a reference grid decodes the coded information in the form of Moire patterns.

In U.S. Pat. No. 4,888,648, there is disclosed an image filing system and more specifically, an electronic album suitable for filing and storing image information which can be readily retrieved.

There remains a need, however, for incorporating an image of one or more customers (in the preferred embodiment, account holders) on bank checks which, in the typical case are presently issued to an account holder in two stages. First, when a customer opens an account, he/she may be given a small quantity (for example, ten) of checks which have only limited information printed thereon, usually the bank name and standard check related language such as "Pay to the Order of:" and the like. Generally, these first issued "temporary checks" have no specific customer related information printed thereon, and the customer must print any such information on the check manually. These first issued checks are then usually followed by a larger quantity of checks which are printed to include customer name, address, phone no. and the like.

It will be appreciated that the personal identification aspects of present check issuing systems is wholly unsatisfactory, particularly (though not limited to) the issuance of initial "temporary checks".

The present invention, in a preferred embodiment relates to the production of personalized documents, such as bank checks where fully printed interim checks including account holder(s) image(s) are provided the customer immediately upon opening an account, followed by production of large quantities of checks ordered (and reordered) by the customer at various intervals. Specifically, an image of the person who is the owner of the account is captured in real time with a video camcorder or a still video camera. The images are converted to digital image files on a personal computer through the use of a camcorder and/or VCR, or a still video camera and still video diskette player, which feeds a signal to a video image capture board and an associated image processing software package mounted in a personal computer.

Once the image is in the form of a digital image file in the personal computer, and with the aid of a suitable software package, the image is cropped and scaled to the required size and then converted to an appropriate image file format for further processing.

In the preferred bank check embodiment of the invention, the check itself is composed as a graphics image file in the personal computer through the use of a graphic input tablet, a graphics display system, and a forms composition software package. The text to appear on the check associated with the checking account owner and the specific bank is then composed.

When a customer opens a new checking account or wants to update his or her checks with a personal image, the customer's image is captured when, for example, the customer appears at the bank to sign their signature card, or during any other visit to the bank. The operator of the personal computer used in the capture process then edits the check format with the proper customer name, address, telephone number, account number, starting check number, serial number and bank information (if that was not previously entered). The personal image file previously generated by the picture check system software is now merged with the edited check image to form the complete picture check. A laser printer connected to the personal computer may be used to print an initial set of checks (usually a fairly small number) which are immediately presented to the customer.

For joint accounts, it will be appreciated that pictures of both account holders may be incorporated in the check format in exactly the same manner as described above.

The picture check system software also generates another file which will be used to drive a higher resolution printer. That output will be used as the camera-ready copy for printing a full set of checks to be sent to the customer. The picture check system software will also print the mailing label for the order (and future orders) at that time.

When, at some future time, the customer needs more checks, the system is employed to print out another camera-ready copy to be sent to the printing plant. This way, if any corrections or additions are necessary to the customer or bank information on the check, the existing text can be edited to include such changes.

In addition, for any customer who wants an updated personal image, a visit to the bank to capture another image is all that is required. Since this system will be on hand for new account customers, this additional update service for existing customers can be made available for little or no extra cost.

Thus, in accordance with one embodiment of the invention, there is provided a method of composing bank checks with a picture of an account holder on each check comprising the steps of a) capturing a real time video image of the account holder at a bank site; b) converting the image to a digital image file in a personal computer; c) composing a picture check as a graphics image file in the personal computer; d) merging the digital image file and graphics image file to form a picture check; and e) printing one or more picture checks at the bank site and delivering the picture checks to the customer.

In accordance with another embodiment, there is provided apparatus for producing a bank check which include a picture of an account holder comprising an image capture device located at a bank site for capturing the account holder's image; means for converting the user's image to a digital image file and for storing said digital image file in a memory device of a central processing unit; means for composing the document in the form of a graphics image file; means for merging the digital image file and graphics image file to form a complete document format; and means located at the bank site for printing the bank check.

The following benefits are achieved by the above described exemplary embodiment of the invention:

1) positive identification of the owner of the document on which the personal image is printed;
2) unique selling feature;
3) fast and easy capture of the personal image;
4) the first checks for a new account are available immediately upon opening the account;
5) fast, low cost, camera-ready copy is available for printing additional copies of the checks as soon as the account is opened;
6) the personal image is available in the bank host computer data base for positive identification of a person for other banking functions, such as access to a safety deposit box.

Additional objects and advantages of the invention, as well as additional applications for the subject invention will become apparent from the detailed description which follows.

BRIEF DESCRIPTION OF THE DRAWINGS

FIG. 1 is a schematic diagram of an image capture system in accordance with an exemplary embodiment of the invention; and FIG. 2 is a front elevation of a bank check produced in accordance with the invention.

DETAILED DESCRIPTION OF THE DRAWINGS

Figure 3:
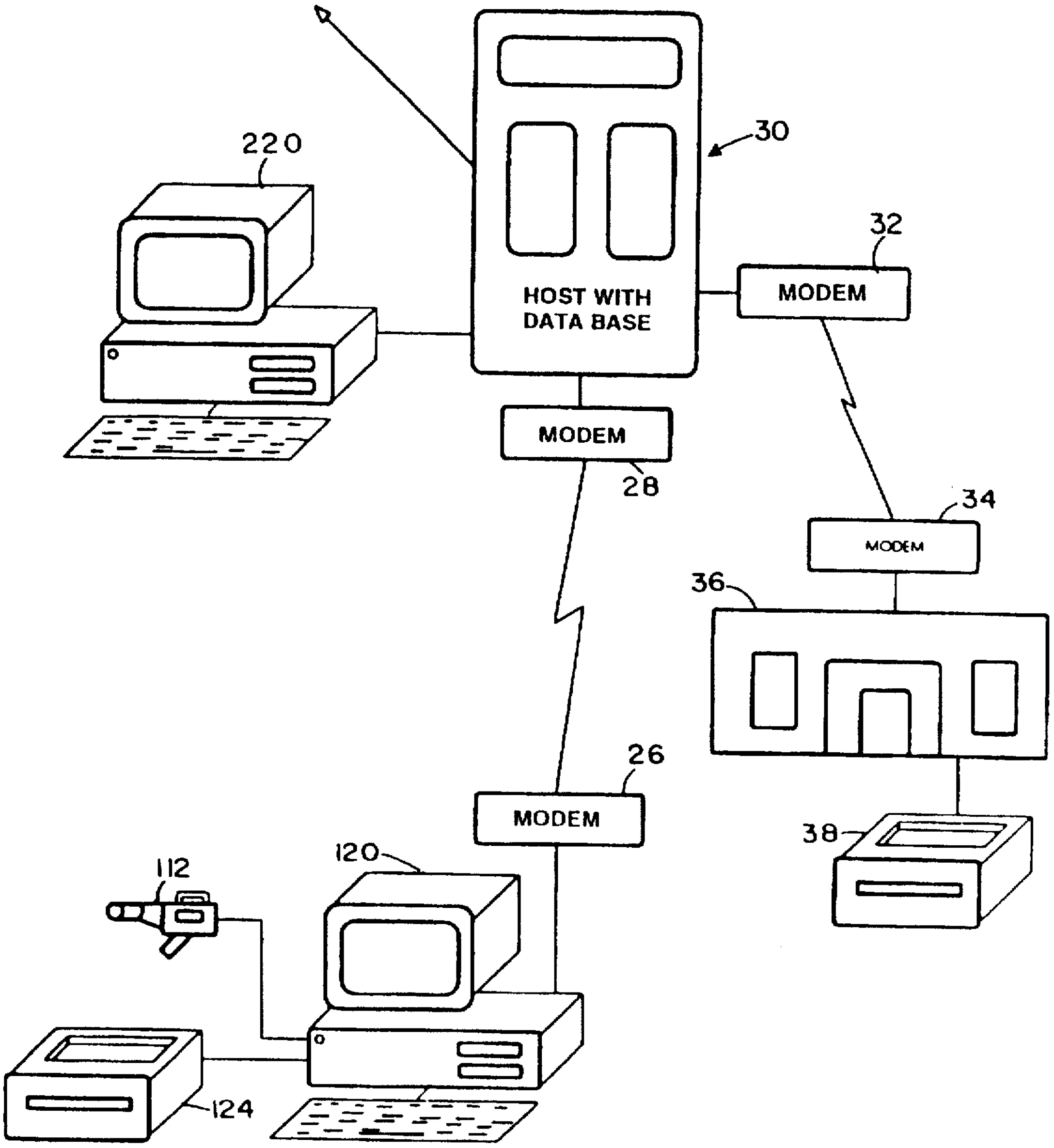
FIG. 3 is a schematic diagram of the image capture system of FIG. 1 in combination with a check manufacturing and printing system.

With reference now to FIG. 1, an image capture system is shown at 10 and includes alternative means by which an image may be initially captured. For example, a camcorder 12, still video camera 14 or VCR 16 may be used in a conventional manner to capture the customer(s) image for use in producing bank checks in accordance with an exemplary embodiment of the invention (see FIG. 2). In the event a camcorder 12 is employed, the image signals may be fed directly to a personal computer 20 by means of a video image capture card 22 (mounted within the computer), or through a VCR 16 which transmits the image signals to the personal computer 20 by means of the same video image capture board 22.

In the event a still video camera 14 is employed, the image signals are transmitted to the personal computer 20 by means of a still video diskette player 18 which transmits the signals to the video image capture board 22. The video image capture board 22 may be a conventional board such as the True Vision TARGA+™, in conjunction with a suitable image processing software package, both of which are mounted in the personal computer 20.

It will be appreciated that an alternative method of converting an image of a person to a digital image file is simply to scan an existing photograph of the person with a conventional digital scanner.

Once the image is in the form of a digital image file in the personal computer 20, and utilizing the above mentioned software package, the image may be cropped and scaled to the required size and then converted to an appropriate image file format for further processing. In the manufacture of bank checks, for example, the check itself is composed as a graphics image file in the personal computer 20 through the use of a graphic input tablet 24, a graphics display system, and a forms composition software package located within the personal computer 20. The text on the check relating to the checking account owner (name, address, phone no., etc.) and the bank (name, address, branch, etc.) is then composed in an easily edited format.

A new or existing customer may have their image captured in the bank when they sign their signature card upon opening the account, or during any other visit to the bank. The personal computer 20 operator then edits the check format with the proper customer name, address, telephone number, account number, starting check serial number, and other appropriate bank information. The personal image file previously generated by the picture check system software is now merged with the edited check image to form the complete bank check 26, as illustrated, for example, in FIG. 2. A laser printer 28 connected to the personal computer 20 is used to print an initial set of checks which are immediately given to the new customer (or to an existing customer where updated image checks are sought). Of course, for joint accounts, pictures of both account holders are placed on the check in exactly the same manner.

The software package also generates another file which will be used to drive a higher resolution printer. That output will be used as the camera-ready copy for printing a full set of checks to be sent to the customer, as explained in further detail below.

With reference now to FIG. 2, the picture check 26 is illustrated which includes a picture image 30 in the upper lefthand corner of the check, customer or account holder information 32 and bank information 34 (as well as other miscellaneous information) the check having been produced in the manner described hereinabove.

Turning now to FIG. 3, a system configuration for manufacturing personal checks is illustrated wherein components in common with the image capture system of FIG. 1 are designated by similar reference numerals with the prefix "1" added. Thus, the initial image capture system 110 is shown to include a camcorder 112 inputting to the personal computer 120 with the initial printing of bank checks via laser printer 128. At the same time, however, the personal computer 120 is connected by way of modems 36 and 38 to a host computer 40. The host computer, in turn, communicates via modems 42 and 44 with a forms manufacturing plant 46. Here, a higher resolution printer, for example, a 600 d.p.i. laser printer 48, is utilized to produce a camera-ready copy for printing a full set of checks to be sent to the customer.

At the same time, the host computer 40 may communicate the image file and billing information to bank image data base applications (designated by arrow 50).

After the initial set of checks 26 is used up, the customer may order new checks by appearing at any bank branch equipped with a personal computer, for example, 220 linked to the host computer 40, and the system will print out another camera-ready copy to be sent to the printing plant 46. In this way, if any corrections or additions are necessary to the customer or bank information 32, 34, respectively, on the check 26, the existing text can be edited to include them. Again, as noted above, if the customer wants an updated personal image, a visit to the bank is all that is required.

While the above described embodiment relates to the composition of bank checks, the concept embodied in the exemplary embodiment is useful to provide personal or other images on any of the following documents or items:

1) diplomas;
2) college transcripts;
3) certificates of completion for courses and training sessions;
4) property deeds containing an image of the actual property;
5) certificates of title for automobiles, boats, trailers, airplanes showing the titled vehicle;
6) life and accident insurance policies showing the injured and beneficiaries;
7) vehicle insurance policies showing the condition of the vehicle at the time the insurance was issued;
8) passports;
9) driver's licenses
10) traveler's checks showing the person to whom they were issued;
11) credit cards made theft-proof by showing the holder's image on the card;
12) identification cards of all kinds, including those for senior citizens, sheriff's cards, frequent flyers, clubs and businesses, etc.;
13) school bus passes showing the person to whom they were issued;
14) commuter passes showing the person to whom they were issued; and
15) transportation tickets (airline, bus, train, boat) made theft-proof by showing the purchaser's image on the ticket.

In every case described above (the list is exemplary only and not intended to be restrictive), once an image of a person or object is captured, the invention has the additional benefit of storing the image in a computer data base for further use in identification, verification, comparison or inventory purposes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of composing a personalized document with a picture of a user of the document on each document comprising the steps of:

a) capturing a real time video image of the user at a first site; immediately thereafter, b) converting the image to a digital image file using a video image capture board mounted in a personal computer;

c) composing a portion of the personalized document as a graphics image file in the personal computer and adding personalized identifying data to the graphics image file;

d) merging the digital image file and graphics image file to form the document;

e) printing one or more of the personalized documents at the first site; and f) transferring the digital image file via modem and storing said digital image file in a host computer data base at a second site remote from the first site; and g) producing additional of the personalized documents at a document manufacturing plant remote from the first and second sites via communication with the host computer data base.

2. The method of claim 1 wherein the document is a bank check and the site is a bank.

3. A bank check produced in accordance with the method of claim 2.

4. The method of claim 1 wherein step a) is carried out utilizing a still video camera.

5. The method of claim 1 wherein step c) is carried out utilizing a graphics input tablet or graphics display system and a check composition software package.

6. The method of claim 1 wherein step e) is carried out utilizing a laser printer.

7. The method of claim 1 wherein, for joint users, a real time video image is captured for each user.

8. The method of claim 1 wherein the digital image file created in step b) is cropped and scaled to a required size and converted to an image file format.

9. The document produced by the method of claim 1.

10. Apparatus for producing a personalized bank check which includes a picture of an account holder comprising:

an image capture device located at a bank site for capturing a real time video image of the account holder;

means including a video image capture board for converting the account holder's image to a digital image file and for storing said digital image file in a memory device of a central processing unit located at another site remote from the bank site;

means for composing the personalized bank check in the form of a graphics image file and for adding personalized text to the graphics image file;

means for merging the digital image file and graphics image file to form a complete bank check format;

means located at the bank site for printing the personalized bank check; and means for permitting said host computer to communicate with a check manufacturing plant located at a third site remote from said bank site and said another site.

11. The apparatus of claim 10 wherein said central processing unit comprises a personal computer.

12. The apparatus of claim 11 and including a main host computer in communication with said personal computer.

13. The apparatus of claim 10 wherein said image capture device comprises a VCR.

14. The apparatus of claim 10 wherein said image capture device comprises a camera.

15. The apparatus of claim 10 wherein said image capture device comprises a camcorder.

16. The apparatus of claim 10 wherein said printing means includes a laser printer.

17. The apparatus of claim 10 wherein said composing means includes a graphic input tablet and a graphics display system.

18. Apparatus for producing a personalized identification document which includes a picture of an owner of the document comprising:

an image capture device located at a first site for capturing an image of the owner;

means including a video image capture board for converting said image to a digital image file and for storing said digital image file in a memory device of a central processing unit at a second site located remote from said first site;

means for composing the personalized document in the form of a graphics image file and for adding personalized text to the graphics image file;

means for merging the digital image file and graphics image file to form a complete document format including personalized text;

means located at the first site for printing the personalized identification document; and means for permitting said host computer to communicate with a personalized production apparatus located at a remote manufacturing plant remote from both said first site and said second site.

* * * * *

UNITED STATES PATENT AND TRADEMARK OFFICE

CERTIFICATE OF CORRECTION

PATENT NO. : 5,748,755
DATED : May 5, 1998
INVENTOR(S) : Johnson et al.

It is certified that error appears in the above-identified patent and that said Letters Patent is hereby corrected as shown below:

Drawings,
Please amend Figure 3 as specified below:

a) reference numeral 26 should read 36;
b) reference numeral 28 should read 38;
c) reference numeral 30 should read 40;
d) reference numeral 32 should read 42;
e) reference numeral 34 should read 44;
f) reference numeral 36 should read 46;
g) reference numeral 38 should read 48;
h) a reference numeral 50 should be applied to the arrow extending from the "Host With Data Base" block; and
i) a reference numeral 110 with an arrow-type lead line should be added to generally indicate the assembly of components 112, 120 and 124.

Signed and Sealed this

Twenty-third Day of April, 2002

Attest:

JAMES E. ROGAN
*Director of the United States Patent and Trademark Office*

*Attesting Officer*